United States Patent [19]

Pong et al.

[11] Patent Number: 4,967,862
[45] Date of Patent: Nov. 6, 1990

[54] TETHER-GUIDED VEHICLE AND METHOD OF CONTROLLING SAME

[75] Inventors: William Pong, Brookfield Center; Joseph F. Engelberger, Newtown; William S. Kazman, Danbury, all of Conn.

[73] Assignee: Transitions Research Corporation, Danbury, Conn.

[21] Appl. No.: 322,345

[22] Filed: Mar. 13, 1989

[51] Int. Cl.⁵ .................. B62D 51/04; B60L 3/00
[52] U.S. Cl. ................. 180/19.3; 180/6.5; 180/279; 180/280; 15/319; 15/340.2; 293/411; 293/102; 293/120
[58] Field of Search .............. 180/6.5, 14.6, 19.1, 180/19.2, 19.3, 274, 275, 279, 280, 167; 15/1.7, 319, 339, 340.1, 340.2; 293/2, 4, 102, 117, 120, 127

[56] References Cited

U.S. PATENT DOCUMENTS

| | | | |
|---|---|---|---|
| 3,083,396 | 4/1963 | Senne et al. | 15/327 E X |
| 3,439,368 | 4/1969 | Myers | 15/319 X |
| 3,608,659 | 9/1971 | Gardner | 180/19.3 |
| 3,676,884 | 7/1972 | Wulc | 15/319 X |
| 3,731,756 | 5/1973 | Hajec | 180/6.5 |
| 3,753,265 | 8/1973 | Wulc | 15/319 X |
| 3,895,288 | 7/1975 | Lampen et al. | 323/95 X |
| 3,896,892 | 7/1975 | Kohls et al. | 180/19.3 X |
| 3,935,922 | 2/1976 | Cooper et al. | 180/98 |
| 3,989,116 | 11/1976 | Hirano | 180/19.3 |
| 3,996,641 | 12/1976 | Eichholz | 15/339 |
| 4,037,290 | 7/1977 | Rose et al. | 15/340.1 X |
| 4,081,047 | 3/1978 | Lovell et al. | 180/19.3 |
| 4,113,042 | 9/1978 | Vaill | 180/19.3 |
| 4,114,711 | 9/1978 | Wilkins | 180/65 |
| 4,173,809 | 11/1979 | Ku | 15/340.2 X |
| 4,397,372 | 8/1983 | De Kraker | 293/127 X |
| 4,419,783 | 12/1983 | Steffen | 15/339 |
| 4,546,840 | 10/1985 | Yukishige et al. | 180/279 X |
| 4,596,412 | 6/1986 | Everett et al. | 293/127 X |
| 4,688,656 | 8/1987 | Kent | 180/279 |
| 4,697,661 | 10/1987 | Pajerski et al. | 180/19.3 X |
| 4,700,427 | 10/1987 | Knepper | 15/319 |
| 4,811,979 | 3/1989 | Peter et al. | 293/120 X |

FOREIGN PATENT DOCUMENTS

| | | | |
|---|---|---|---|
| 0319700 | 6/1989 | European Pat. Off. | |
| 2512407 | 3/1983 | France | 293/2 |
| 0006255 | 1/1979 | Japan | 293/2 |

Primary Examiner—Charles A. Marmor
Assistant Examiner—Brian L. Johnson
Attorney, Agent, or Firm—Kramer, Brufsky & Cifelli

[57] ABSTRACT

A tether-guided vehicle and method of controlling same. A tether sensor indicates the angle, $\theta$, of the tether with respect to the vehicle and the tension, T, on the tether. A contact-sensitive bumper disposed about at least the front periphery of the vehicle indicates the position, P, and force, F, of contact with an obstacle. A drive system moves the vehicle in response to tether angle, $\theta$, and tension, T, thereby providing a "servo pull" feature. When the vehicle contacts an obstacle, it stops, backs up, turns and resume forward motion to circumnavigate the obstacle, thereby providing an "obstacle avoidance" feature. The servo pull and obstacle avoidance features make the vehicle suitable in a number of applications, such as for canister vacuums, hospital or factory carts, and the like.

17 Claims, 9 Drawing Sheets

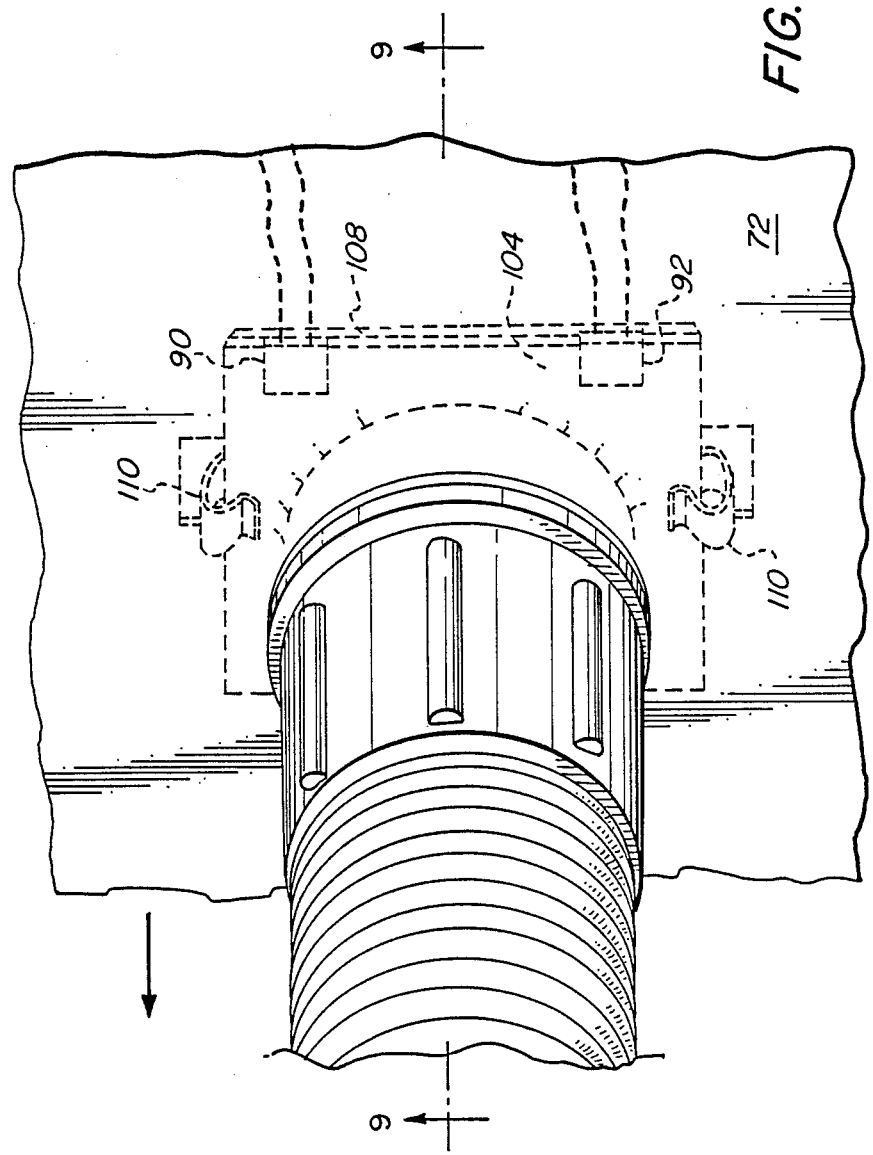

TETHER-GUIDED VEHICLE AND METHOD OF CONTROLLING SAME

TECHNICAL FIELD OF THE INVENTION

The invention relates to movement of "semiautonomous" vehicles about a surface. The vehicles are "semiautonomous" in the sense that they are responsive to external guidance.

BACKGROUND OF THE INVENTION

When using a regular canister vacuum cleaner today, a housekeeper typically drags the canister behind him/her by pulling the hose. Normal cleaning operation is performed by maneuvering the nozzle amidst different pieces of furniture on the floor and by holding on to the upper portion of the stiff (metal) hose tube. When stretching out to reach and clean further away (in corners etc.), the canister follows behind, as on a leash. Consequently, the operator must also exert a pulling force on the canister. The pulling force is especially noticeable if the canister must pass over carpet edges, sills etc., which may be inconvenient.

Another practical problem with canister vacuum cleaners is that, when pulling it, the canister sometimes gets stuck behind obstacles, i.e. table or chair legs, bed corners, etc. If so, the operator must stop pulling, turn the hose in a direction away from the obstacle and cause the canister to circumnavigate the obstacle by pulling in different directions. This can be both tedious and annoying.

As will become evident hereinafter, the present invention addresses these problems by, among other things, causing movement of a tethered vehicle, such as a vacuum cleaner, in response to tension vectors on the tether (i.e., vacuum hose) and contact to the vehicle with an obstacle. The following U.S. Pat. Nos. 3,083,396, 3,439,368, 3,676,885, 3,753,265, 3,896,832 and 4,173,809, are referenced, and distinguished from the present invention.

U.S. Pat. No. 3,083,396 (Senne et al) relates to a vacuum cleaner control wherein the motor-fan unit can be turned on or off by movement of the hose with respect to the canister. The Senne et al patent can be differentiated from the present invention in that Senne et al does not disclose the automatic movement of the vacuum cleaner in response to tension on the vacuum hose or contact with an obstacle.

U.S. Pat. No. 3,439,368 (Myers) discloses a vacuuming machine for cleaning the bottom of a swimming pool. The machine is provided with a guide control system which will change the direction of travel a predetermined amount as the machine encounters obstructions to the side or front. Myers' vacuuming machine can be distinguished from the present invention in that Myers' machine does not incorporate a driving aspect in response to the tension on the tether.

U.S. Pat. No. 3,676,885 (Wulc '885) discloses a suction cleaner vehicle which moves in accordance with preprogrammed instructions. When the vehicle impacts an obstacle, a multi-directional switch mechanism operates to rotate the vehicle away from the obstacle. As with the Myers patent, there is no disclosure in Wulc '885 relating to the movement of the cleaner vehicle in response to the tension vector on a vacuum hose as in the present invention.

U.S. Pat. No. 3,753,265 (Wulc '265) discloses a cleaning vehicle which is an improvement over the Wulc '885 patent, previously discussed. The main distinction in Wulc '265 over Wulc '885 is the location of the drive mechanism being separate from the vehicle so that an operator can manually control the driving mechanism. However, Wulc '265 does not mention or even suggest the movement of the vehicle in response to tension being placed on the tethered hose.

U.S. Pat. No. 4,173,809 (Ku) discloses a vacuum cleaner apparatus which moves randomly across a carpet and changes direction of movement whenever an obstacle is encountered. As with the references described before, Ku does not disclose the movement of the vacuum cleaner in response to a tension on the tethered vacuum hose.

U.S. Pat. No. 3,896,892 (Kohls et al.) discloses a manual control for a self-propelled vehicle. A forwardly ex longitudinally of the tiller by an operator to regulate the direction (forward/reverse) and speed of operation of the vehicle drive motor. From a neutral position, the tiller can be moved to the rear to reverse the drive motor, and can be moved forward to energize the drive motor in two forward speeds. This is accomplished by three switches (70, 71 and 72) illustrated in FIG. 6 of the patent.

DISCLOSURE OF THE INVENTION

It is therefore an object of this invention to provide a technique for (1) providing a "servo pull" to assist the operator in applying a pulling force on the canister, and (2) providing "obstacle avoidance" to prevent the canister from getting stuck behind obstacles.

According to the invention, a semiautonomous vehicle is provided with a tether, a driving and steering mechanism, a tether sensor for receiving external guidance inputs in at least one axis, and a contact-sensitive bumper for sensing collisions of the vehicle with an obstacle. A microprocessor receives input from the tether sensor and bumper and supervises the motion of the vehicle. The bumper is disposed about at least the front periphery of the vehicle.

Primarily, the tether sensor is responsive to a force input to control the forward speed of the vehicle, thereby providing a servo pull to assist the operator in applying a pulling force to the vehicle. The tether sensor may also include a second "axis" of control wherein it is responsive to angular (directional) inputs from an operator to control the direction of forward movement (i.e., steering) of the vehicle. Various embodiments of the tether sensor are disclosed.

In one embodiment of the invention, the vehicle is a vacuum cleaner having a canister body, two drive wheels, a hose serving as the tether, and a contact-sensitive bumper.

In another embodiment of the invention, the vehicle functions "servo trailer" behind another robotic vehicle, such as is disclosed in commonly-owned, co-pending U.S. patent application No. 307,765 filed Feb. 7, 1989, entitled "Autonomous Vehicle for Working on a Surface and Method of Controlling Same".

In another embodiment of the invention, the vehicle functions as a cart to be towed by a person, hooked onto a wheelchair, or the like.

According to a feature of the invention, the bumper is sensitive to the position of contact with an obstacle, via-a-vis the periphery of the vehicle.

The basic idea is that the bumper indicates not only when a collision has occurred, but also where along the bumper (i.e., along the periphery of the vehicle) the collision has occurred.

If the bumper is of an analog type, the output signal is proportional to the location of impact on the bumper. A suitable bumper is disclosed in commonly-owned, co-pending U.S. patent application No. 265,784 filed on Nov. 1, 1988, entitled "Bumper for Impact Detection" and incorporated by reference herein.

If, on the other hand, the bumper is of a digital type (e.g., with microswitches or Tape-Switches ®), its sensing must be divided into sections: minimum left/right and preferably also a few sections on each side.

When a collision is detected, the following actions are taken:
 a. the vehicle stops immediately;
 b. the vehicle backs up slightly (on the order of four inches or ten centimeters);
 c. a system controller determines where the collision occurred with respect to the periphery and forward direction of travel of the vehicle;
 d. the vehicle turns away from the obstacle, far enough for it to be able to go around it safely;
 e. the vehicle circumnavigates the obstacle and resumes normal (hose following) operation.

If the obstacle is wide, the steps a through e above can be repeated, until a detour around the obstacle can be made.

This invention is especially valuable for handicapped and elderly people. With this kind of a device at home, such persons would be able to vacuum their apartment or house themselves, without having to rely on external assistance.

Another application for this invention is in the area of (semi-) professional cleaning. Canister vacuuming is often performed in offices, etc. For professional people, who spend up to eight hours a day cleaning, such a servo "help" function will relieve stress and strain.

In a wider perspective, this invention can be used in any application where a servo pull function would be helpful; for instance, hospital employees pulling food carts in corridors, factory employees pulling carts with supply from storage to production areas, etc.

Other objects, features and advantages of the invention will become apparent in light of the following description thereof.

BRIEF DESCRIPTION OF THE DRAWINGS

FIG. 10 is a detailed top view of the tether sensor of FIG. 9.

DETAILED DESCRIPTION OF THE INVENTION

Figure 1:
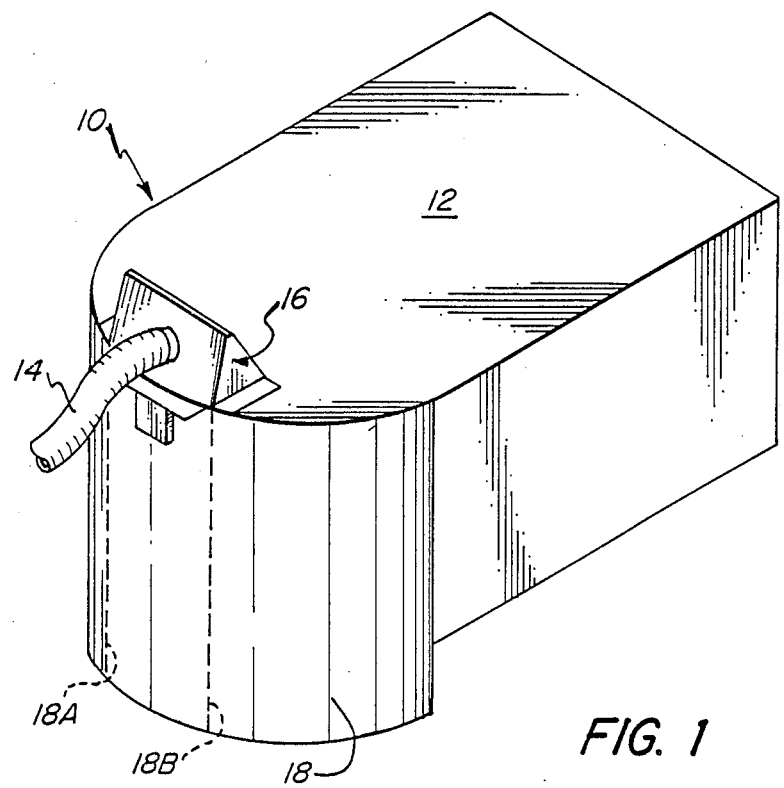
FIG. 1 is generalized, perspective view of a vehicle embodying this invention.

FIG. 1 shows a generalized perspective view of the semiautonomous vehicle 10 of this invention. The vehicle 10 has a body portion 12, wheels (e.g., shown in FIGS. 6, 7 and 8) for movement and turning, a tether 14 which is illustrated as a vacuum cleaner hose, a tether sensor 16, a contact sensitive bumper 18, and a control system (shown in FIG. 3) for receiving inputs from the steering sensor 16 and bumper 18 and for controlling (shown in FIG. 5) the movement and turning of the vehicle 10. One skilled in the art to which this invention pertains will readily appreciate that the control system may direct movement and turning of the vehicle through drive motors connected to the wheels.

Figure 13:
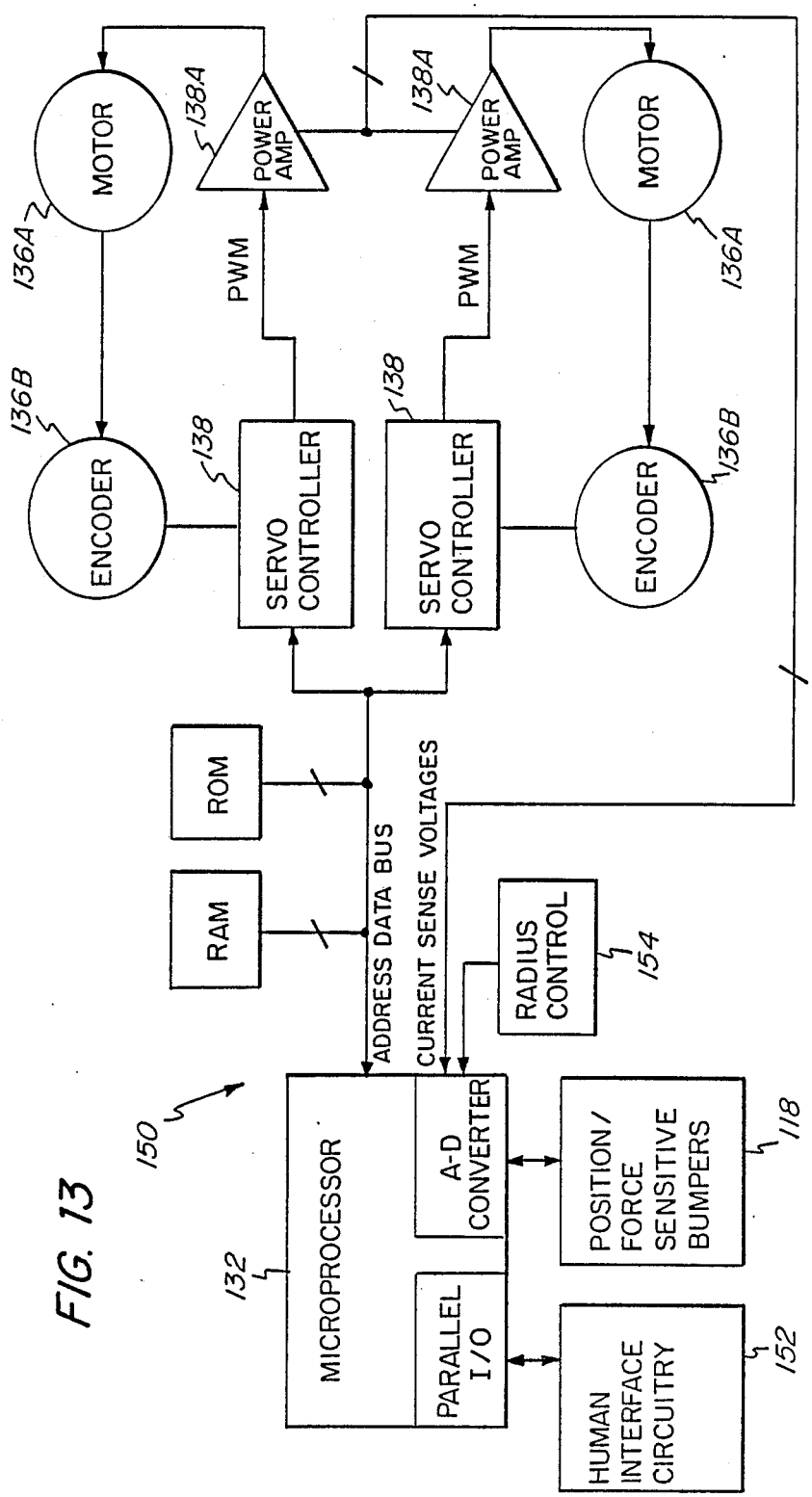
FIG. 13 is a block diagram illustrating one form of a detailed embodiment of the control system for the vehicle of FIG. 1.

For example, the control system for turning the wheels, as shown in FIG. 13, may consist of a low cost 8-bit microprocessor 132 such as the Motorola 68HC11, a control version of 6800 microprocessor containing 8 on-chip analog to digital converter channels which are multiplexed into an 8-bit port. There are 8,192 bytes of volatile random access memory (RAM) used for dynamic data and 32,768 bytes of read-only memory (ROM) are used for programs which define the behavior of the system.

The Drive Motor Controller 138 may comprise a digital servo control chip such as the Newlett-Packard HCTL-1000, and servo amplifiers which drive the motor/encoders 136. Such motors are equipped with encoders such as 500 line quadrature encoders which transmit wheel rotation position and sense to the drive motor controller 138.

FIG. 13 illustrates the system configuration of microprocessor 132 and drive motor controller 138 in one preferred embodiment 150. Those of ordinary skill in the art will recognize that other components may be used in a functionally equivalent manner.

In FIG. 13, the motor/encoders 16 are illustrated as motors 136A and encoders 136B. The drive motor controllers 138 provide a pulse width modulation (PWM) output to power amplifiers 138A, such as Motorola Sensefet H-Bridge or Sprague UDN-2965W-2 Power Amplifiers, connected as shown to provide current sense voltages to the microprocessor 132.

In one embodiment, the vehicle is equipped with three wheels, a forward, passive, pivotable wheel, and two driven wheels, the three wheels arranged in a tricycle configuration. Turning is accomplished by differentially driving the two driven wheels.

Alternatively, the vehicle has a total of two wheels, both driven differentially to effect steering. In this case, the vehicle would rest on the front vacuum (power) nozzle as the third point of contact with the floor. Gliders may be used to decrease friction at the points of nonrolling contact with the floor.

In FIG. 13 are shown human interface circuitry 152 and radius control 154. The human interface circuitry 152 would include user interfaces such as an on/off switch, indicator lights, and the like. The radius control 54 would provide user input to set the radius "R", or forward exploratory travel distance of the vehicle.

Figure 2:
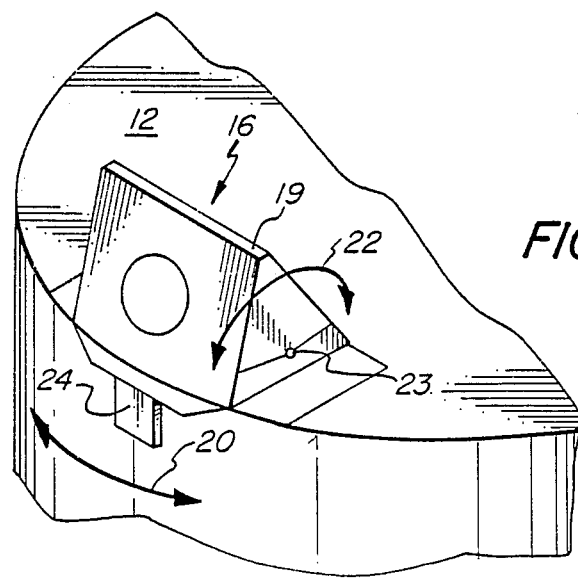
FIG. 2 is a perspective view of a portion of the vehicle of FIG. 1.

FIG. 2 is a generalized view of the tether sensor 16 of FIG. 1, with the hose 14 removed. The tether sensor comprises a housing 19 mounted atop the cannister body 12. The housing is free to swivel with respect to the forward motion of the vehicle, as indicated by an arrow 20, and is free to tilt forward, as indicated by the arrow 22 and a pivot point 23. A tang 24 extends from the housing 19 over the front (leading) edge of the vehicle.

As will be explained in greater detail hereinafter with respect to FIGS. 4A and 4B, the front periphery of the vehicle is provided with a position and force sensitive bumper. As illustrated by the dashed lines 18A and 18B in FIG. 1, a central region ("in front" zone between the lines 18A and 18B) of the bumper 18 is designated for receiving inputs from the tether. The region outside of the lines 18A and 18B is designated for obstacle avoidance. In other words, it is anticipated that contact with obstacles will occur in the region outside of the lines 18A and 18B.

The tang 24 is biased forward (by any suitable means such as springs, resilient foam or the like) to exert a force on the bumper in the central area when there is no tension on the tether. This force is treated more or less as an obstacle encounter, and causes the vehicle to stop. (It will be evident hereinafter that bonafide obstacle encounters result in further action beyong stopping the vehicle). As tension is exerted on the tether (vacuum hose 14), the tang 24 exerts less force on the bumper 18. This force, as is explained with respect to FIGS. 4A and 4B, is sensed by the bumper 18 and provided as an input to the vehicle controller (shown in FIG. 3) to control the speed of forward motion of the vehicle. This describes an emodiment of the servo pull feature of the invention. In light of the disclosure made herein, those skilled in the art to which this invention most nearly pertains will recognize that a number of arrangements could be provided to translate tether tension into vehicle forward speed.

The tang 24, in cooperation with the bumper 18 (40 of FIGS. 4A and 4B) is also suitable to provide steering inputs to the vehicle controller. As indicated by the arrow 20, the tang 24 will sweep to one side or the other of forward (dead ahead) as the tether (14) is pulled off center. The position of the tang 24 is indicated by the bumper, as is described in greater detail with respect to FIGS. 4A and 4B. Again, in light of the disclosure made herein, those skilled in the art to which this invention most nearly pertains will recognize that a number of arrangements could be provided to translate tether angle into vehicle forward direction.

Two degrees of freedom have been discussed with respect to the tether sensor, tension and angle. Inasmuch as the vehicle 10 is intended to work on a flat surface (i.e., in two dimensions), more degrees of freedom are not required, but it is within the scope of this invention to provide sensing in more axes as its use may be expanded into such multidimensional applications.

A simplified version of the tether sensor could operate solely with tension sensing for controlling forward motion, with steering accomplished in a straightforward, mechanical manner in response to the leverage exerted by the tether upon the vehicle, much as one would steer a two-wheeled cart. Servo gain in the drive motor can be set low enough to minimize the resistive drive force under such steering forces.

Figure 3:
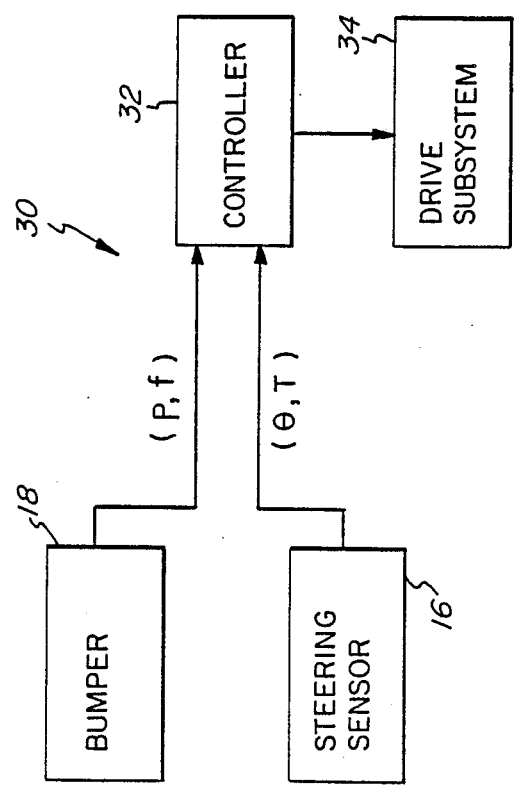
FIG. 3 is a schematic block diagram of a control system for the vehicle of FIG. 1.

FIG. 3 is a schematic of a control system 30 for the vehicle 10. The bumper 18, which is disposed about at least the front periphery of the vehicle, provides an output indicative of at least the position (p) of contact of the vehicle with an obstacle. This position may be defined in terms of an angle with respect to the (origin) position of the tether. In some applications, as discussed hereinbefore, it is also desirable that the bumper 18 provide an output indicative of the force (f) of contact of the vehicle with an obstacle.

The tether sensor 16, to which the tether is attached, provides an output indicative of at least tether tension (T), which in some applications may be indicated by a "pitch" angle at the tether linkage. A strain gauge is also suitably employed to detect tether tension. It is also possible that the sensor 16 provide an output indicative of the "forward" direction ($\theta$) in which the vehicle should proceed. The "forward" direction is defined with respect to the position of the tether, for instance up to 90 degrees to either side thereof. This function would readily be accomplished with a potentiometer, or even with two (left and right) microswitches sensitive to tether angle in the "yaw" (steering) axis.

The outputs of the bumper 18 and the steering sensor 16 are provided to a system controller 32, such as a microprocessor based unit (CPU) with appropriate interfaces. The system controller 32 directs the movement of the vehicle through a drive subsystem 34 which would typically include motors, encoders and power amplifiers. (See FIG. 13 for an embodiment thereof).

Any number of contact sensitive bumper arrangements could be employed for the bumper 18. FIGS. 4A and 4B illustrate an embodiment 40 of the construction of the position and force sensitive bumper (18 of FIG. 1). A compliant layer of conductive foam 42 such as used in packing semiconductor chips is separated from a highly conductive plate 44 by an insulating mesh 46. On contact with an object in the environment, the foam 42 squeezes through the mesh 46 and makes contact at the contact point with the conductive plate 44. A voltage divider is thereby formed, as indicated by the meters 48 connected at points "A" and "B" to the foam 42, and both contact position and contact force can be determined through differential measurements. FIG. 4B is a more diagrammatic representation of the bumper 40, suitable for use as the bumper 18 of the vehicle 10. The bumper 40 is described in greater detail in commonly-owned, copending U.S. patent application No. 265,784 filed on Nov. 1, 1988, entitled "Bumper For Impact Detection", incorporated herein by reference. Using a single sensor for both obstacle detection and for the tether sensor results in low system cost.

As disclosed in detail in U.S. patent application No. 265,784, the bumper 40 comprises an electrically conductive plate 44. A compressible, electrically conductive foam material 42 is mounted to the conductive plate 44. An insulative mesh 46 electrically insulates the conductive plate 44 from the conductive foam 42 when the conductive plate 42 is in a noncompressed state and provides electrical conduction from said conductive plate 44 to said conductive foam 42 through mesh 46 when the conductive material 42 is in a compressed state.

Referring again to FIG. 4A, a physical representation of the bumper 40 in accordance with the present invention is provided. The bumper can be attached to a vehicle 10 by an desired means such as a weldment 120. Also, the bumper is illustrated as having a U shape. However, it is within the terms of the invention to shape the bumper 40 in any desired configuration and to surround any portion or the entire perimeter of the vehicle 10 with the bumper.

The bumper 40 includes an inner, electrically conductive plate 44 which forms an inner (back) plate that can be attached to the vehicle 10. The plate 44 can be constructed of any rigid conductive material such as a metal or alloy selected from the group comprising iron, steel, copper, brass, aluminum alloys thereof, as well as metal impregnated plastic and a plastic having a metallized surface coating.

A compressible, electrically conductive foam material 42 is mounted to the electrically conductive back plate 44. The conductive material 42 is preferably a low density foam which serves as both an electrical conductor for sensing the position and force of impact with an obstacle or object, as well as a mechanical force-absorber for stopping the vehicle. The foam has resistive properties in the range of about 10 to about 1000 kilohms per foot, such as anti-static, conductive foam packaging CP 105 from Charles Water Products, Inc., Newtoon, Mass. Other materials which will provide anti-static control and function as the conductive material are conductive polyethylene CP 501 from Charles Water Products, Inc., conductive foams No. 1927T71 to 1927T76 from McMaster-Carr Supply Company of New Brunswick, N.J., and electrically conductive paper No. 2904T41 from McMaster-Carr Supply Co. Although the present invention is discussed in terms of the foam, it is within the terms of the present invention to substitute any anti-static, compressible, electrically conductive material.

The insulating means 46 comprises a mesh material having openings sized to prevent accidental contact between the conductive plate 44 and the conductive foam material 42 while allowing contact between the conductive plate and conductive foam material from a light impact. The openings in the mesh can be of any desired shape including but not limited to circles, triangles, squares and oblong openings. The mesh can have a resolution from about 0.01 inches (the center-to-center repetition rate) to about 1 foot or more. The dimension of the mesh openings is preferably on the order of 1/10 of the mesh thickness. The mesh 46 can be formed of any insulating material selected from the group comprising polyethylene, nylon, plastic, fiberglass and rubber.

The conductive foam 42 has a protective cover sheet 21 formed of a flexible material to protect the underlying foam from physical damage and may be formed from electrically insulative material. The cover sheet 21 can be constructed of various materials such as polyethylene, nylon, plastic, natural latex, fiberglass, nitrile and silicone rubber. The conductive foam 42 and the cover sheet 21 project outward from an edge 123 of the back (inner) plate 44. The section of conductive foam 42 which is not supported by the back plate 44 provides sensitive position detection as will be discussed hereinafter.

Figure 4A:
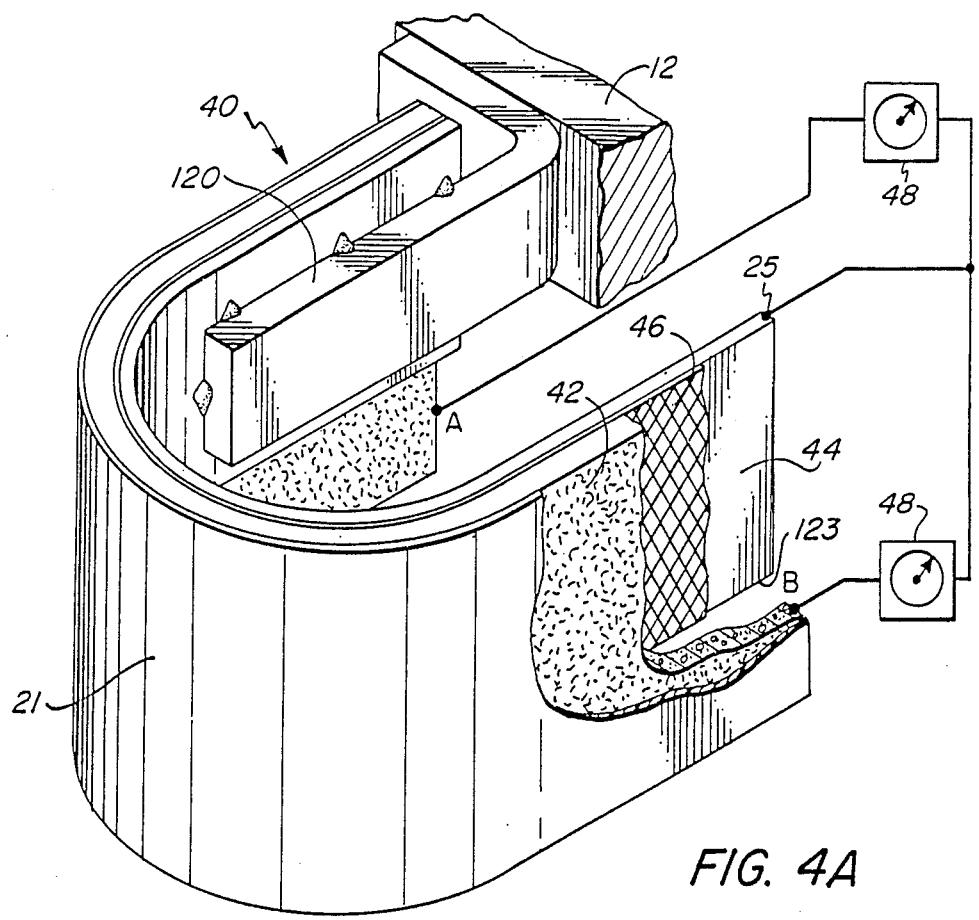
FIG. 4A is a perspective view, partially cutaway and partially in schematic, of a bumper for the vehicle of this invention.
Figure 4B:
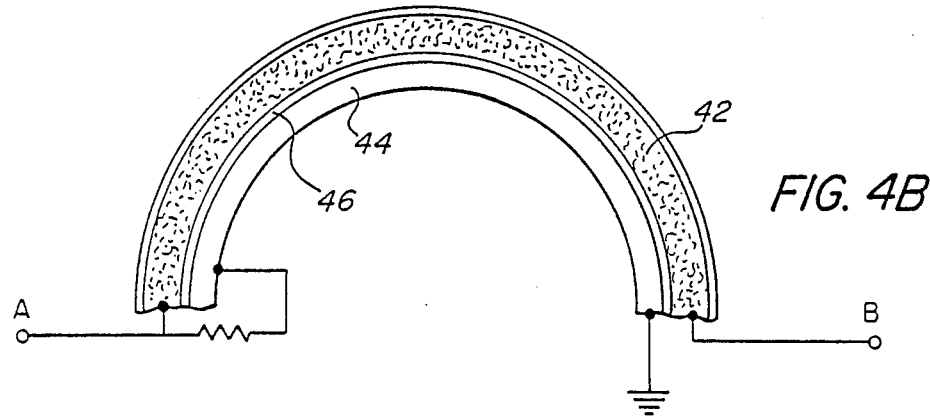
FIG. 4B is a diagrammatic representation of the bumper of FIG. 4A.

To better understand the operation of bumper 40 illustrated in FIG. 4A, a general and then more detailed explanation of its operation follows.

Two ohmmeters 48 are illustrated as connected to points A and B at opposite ends of the conductive material 44. The ohmmeters are also commonly connected to the conductive plate 44 at a common, or ground, point 25. The ground point 25 can be at any suitable location on the conductive back plate 44. By measuring the resistance between the points A and B on the foam material 42, a collision of the bumper with an object can be detected and the point of impact on the bumper 40 determined. Before the bumper 40 is impacted, the insulating mesh 46 separates the foam sheet 42 from the back plate 44 and an open circuit or an infinite resistance exists between the points A and B. When impact occurs, the foam material 42 is forced to make contact at a point with the back plate 44 through the holes of the insulating mesh 46. Measured resistances correspond to the resistance of the length of foam material 42 between the points A and B on the foam material and the point of impact, respectively. The resistance varies linearly across the length of the bumper, with one of the resistances being lowest when the impact point is closest to the point A and highest when the impact point is at the point B. Similarly, the other resistance is lowest when the impact point is closest to the point B and highest when the impact point is at the point A. The position of the impact point can be determined from a comparison of the resistances. In addition, by measuring the absolute resistances, the force of impact can be determined.

Figure 5:
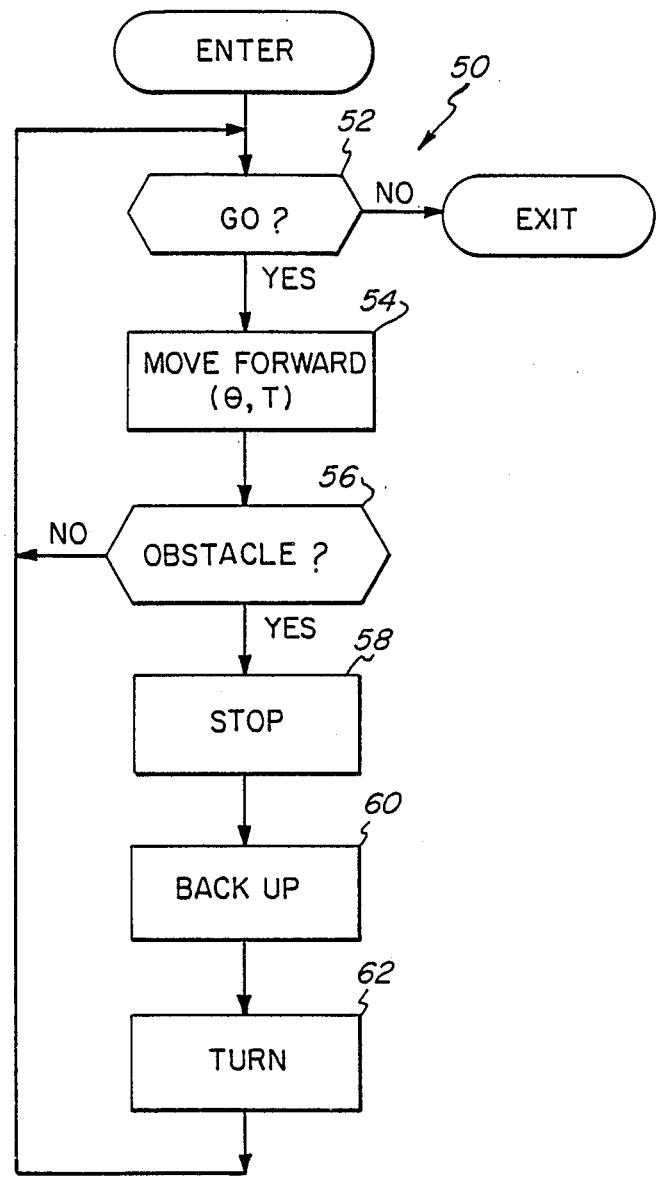
FIG. 5 is a flowchart showing the operation of the vehicle of FIG. 1.

FIG. 5 discloses a method of operating the vehicle 10. The method is represented by a software routine 50 for implementation in the system controller 32 of FIG. 3. In a first step 52, it is determined whether the vehicle is supposed to move forward, to perform its work, such as vacuuming, on a surface, such as a floor. This is simply determined by the existence of tension on the tether, as well as the status of any safety interlocks in the system. If the vehicle is not commanded to go, the routine exits.

In a step 54, the vehicle is directed to move "forward". "Forward" is defined as the +/−90 degrees (180 degrees) of possible vehicle movement with respect to the position of the tether. "Backward" is defined as the +/−90 degrees (180 degrees) of possible vehicle movement diametrically opposed from the position of the tether.

The degree (velocity) and direction of vehicle movement in the forward direction is determined by the tension (T) and angle ($\theta$), respectively of the tether with respect to the vehicle.

In a step 56, it is determined whether the vehicle has encountered an obstacle, as indicated by bumper contact. As mentioned hereinbefore, the bumper is disposed about at least the front (forward) periphery of the vehicle, and is sensitive to the position (P) and possibly the force (F) of contact of the vehicle with an obstacle. If there is no bumper contact, the vehicle proceeds in the forward direction as guided (speed, and possibly steering) by the tether.

If there is contact with an obstacle, in a step 58 the vehicle is caused to stop. At this point, if the vehicle is being towed by another vehicle, a signal is sent to the towing vehicle to stop.

Then the vehicle is caused to back up slightly in a step 60. Typically, backing up on the order of four inches (ten centimeters) would be sufficient. Preferably the vehicle backs up in a direction directly opposite to its pre-obstacle, forward direction of travel. However, it is within the scope of this invention that the direction for backing up be optimized according to the position of obstacle contact, for instance diametrically opposed to the position of bumper contact.

The degree and suddenness of backward motion is somewhat critical in terms of both "user-friendliness" and navigational effectiveness. For instance, in most cases it is not necessary that the backward motion commence in a sudden, jerky manner. Nor is it necessary that the vehicle move further backward than is necessary to effect obstacle clearance when it resumes its forward motion. It is preferable, however, that the change in direction of the vehicle be performed in a safe and effective manner. This may include sounding an audible device indicating that the vehicle is about to move backwards. As a safety consideration, it may also be desirable to monitor the tether tension prior to backing up. If there is a large tension, indicative of a taut tether, it would be preferable to delay the backing up operation until the tension has been alleviated. On the other hand, if there is little tether tension, indicative of a relatively slack tether, the backing up operation could commence sooner.

After having backed up, in a step 62 the vehicle turns through an angle, α, in a direction away from the obstacle, and resumes its forward motion. For glancing blows (collisions with obstacles at nearly 90 degrees from the tether) it is generally sufficient that the vehicle back up a short distance, on the order of three inches (7-8 centimeters), and turn through a small angle, on the order of 5-10 degrees, before proceeding forward again (step 54). For more "head on" collisions, the vehicle may be backed up further, on the order of one foot (30 centimeters) and turned through a larger angle, on the order of 10-20 degrees, before proceeding forward again.

Figure 7:
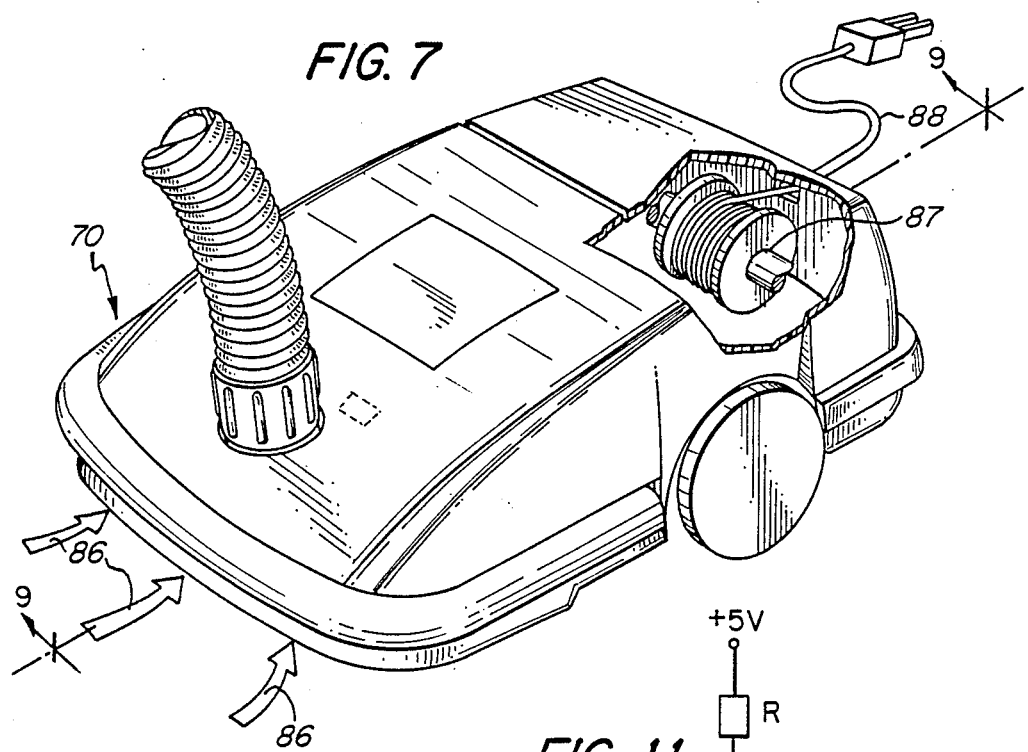
FIG. 7 is a perspective view of the vacuum cleaner of FIG. 6.
Figure 6:
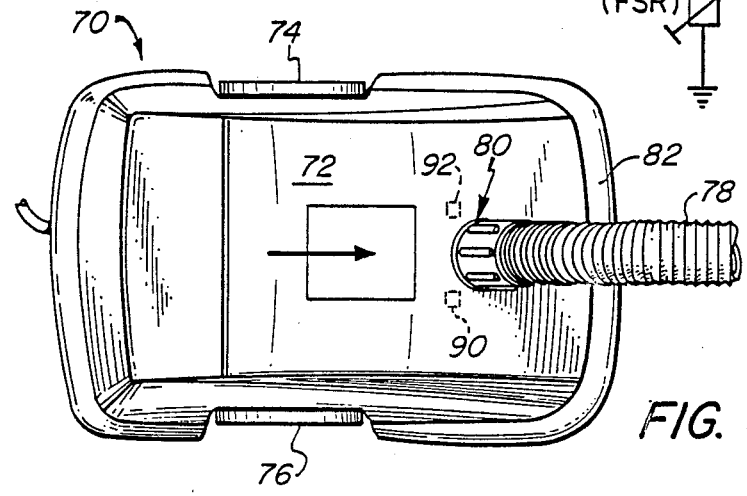
FIG. 6 is a top view of the vehicle of this invention, in a vacuum cleaner embodiment.
Figure 8:
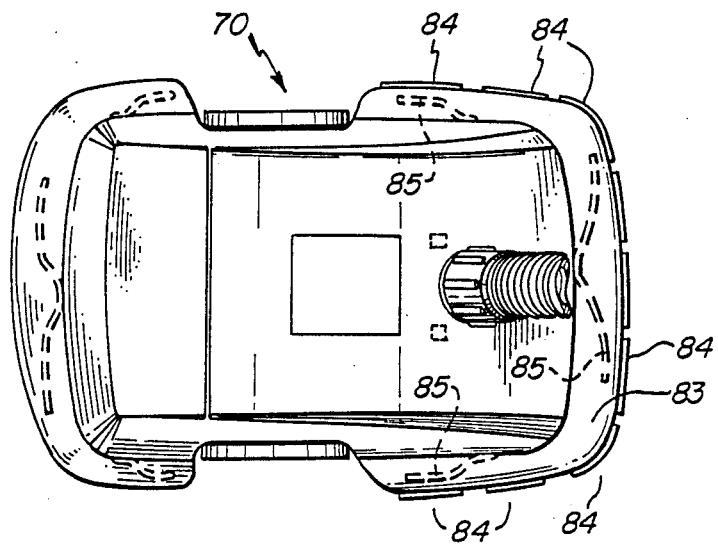
FIG. 8 is a top view of another vacuum cleaner embodiment, similar to that of FIG. 6.
Figure 12:
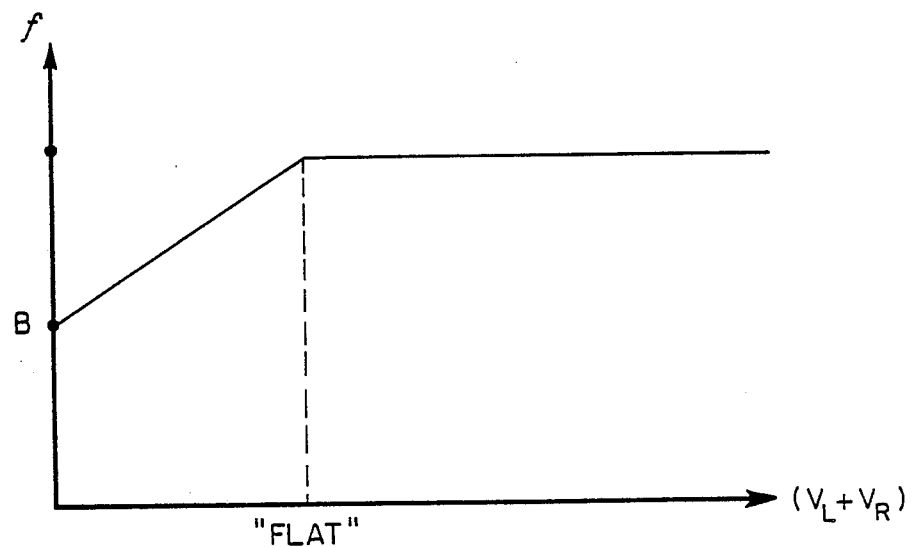
FIG. 12 is a graph illustrating certain details of operation incorporated in the control system of FIG. 3.

FIGS. 6, 7 and 8 relate to specific embodiments of the vehicle of this invention. A vacuum cleaner 70 has a canister body 72, a left wheel 74, a right wheel 76, and a hose 78. The hose attaches at one end to the canister, whereat is disposed the tether sensor 80. A contact-sensitive bumper 82 is disposed about at least the front periphery of the vehicle.

The sensor 80 senses the tension on the tether and responds by driving the vehicle in the direction of the tension vector and at a speed proportional to the tension vector magnitude. If tension is released then the vehicle brakes to a stop. If the tether guided vehicle is accidentally guided into an obstacle, then contact with the obstacle is detected and the vehicle automatically backs up and turns to free itself from the obstacle.

The bumper may be implemented in two different versions. The first version uses conductive foam as a compressing medium. The foam is of the same type as is used for transport and protection of integrated circuits (ICs). A MYLAR tape is adhered onto the outside of the bumper foam. Between is an insulating fiberglass mesh. When the bumper is hit by an object, the MYLAR (trademark), plastic tape (which is electrically grounded) will give electric contact through the mesh, grounding that point of the foam. Electric connections at each end of the foam are connected to two CPU A/D inputs. By differential measurements, the location of impact (as well as the relative force of impact) can be calculated. See U.S. patent application Serial No. 265,784 filed on Nov. 1, 1988, entitled "Bumper for Impact Detection", incorporated herein by reference.

With respect to FIG. 8, the second type of bumper consists of a stiff, U-shaped plastic frame 83, onto the outside of which several sections 84 of TAPE-SWITCH ® (switch) sensors are fastened. The frame is springloaded by springs 85 onto the vehicle.

Upon collision, the TAPE-SWITCH ® sensors will first register a contact, which is sent forward to the CPU. Secondly, the springs will absorb some of the energy by increasing the tension of the springs, i.e., the bumper frame will move closer to the vehicle.

FIG. 7 is a perspective view of the vacuum cleaner of FIG. 6. The arrows 86 indicate suction. A cord reel 87 and power cord 88 are shown.

The invention has significant application in the steering of canister vacuum cleaners. The vacuum hose is a poor method of guiding and steering the canister vacuum. As a consequence the canister is often hitting furniture or door jambs and getting stuck. The user then must stop vacuuming, return to the canister and clear the jam. This system will minimize the occurrence of jams since the overall maneuverability of the vehicle will improve. In the past, only contact with an obstacle or friction stopped a vacuum cleaner in motion. Now the vehicle will stop when tension is released from the hose. If a jam does occur, the vehicle will free itself and allow the user to continue cleaning on an uninterrupted basis.

Figure 9:
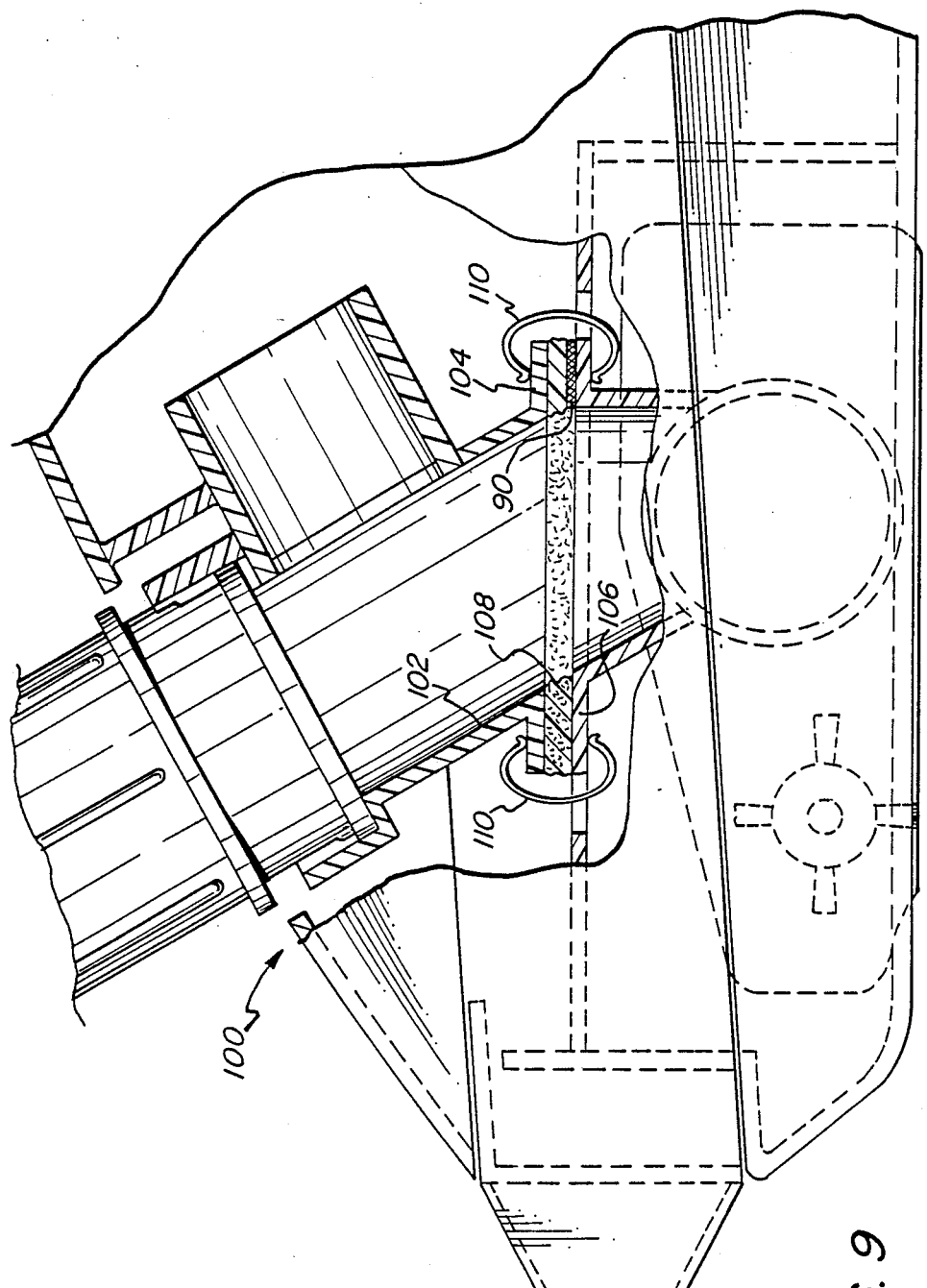
FIG. 9 is a cross section of a tether sensor for the vehicle of FIG. 7, taken on the line 9—9.

FIGS. 9 and 10 show an implementation of the tether sensor using two Force Sensitive Resistors (FSRs) 90 and 92. Inasmuch as FIG. 9 is a cross section taken through the line 9—9 of FIG. 10 (alternatively of FIG. 7), only one FSR 90 is visible in FIG. 9.

The tether sensor 100 essentially comprises two major structural elements; a tube 102 terminating in a flange 104 and a platform 106. A foam piece 108 is sandwiched between the flange 104 and the platform 106. Clips 110 are provided, as shown, to maintain a bias holding the flange 104 against the platform 106. The FSRs 90,92 (90 visible) are disposed between the foam 108 and the platform 106. In this manner, a compliant arrangement is achieved whereby the tube 102 is responsive to tether tension inputs. The clips 110 and foam 108 are selected so that in a quiescent state (no tether tension), the FSRs are in the midpoint of their dynamic range. (It should be noted that the spring clips 110 are shown ninety degrees rotated about the tether sensor between FIGS. 9 and 10, for descriptive clarity.)

As illustrated, the FSRs 90,92 are disposed rearward of the tether. As tension is applied to the tether (as a result of an operator pulling on the tether), the force on the FSRs decreases. This force is translated into a signal provided to the controller for controlling the speed of the vehicle.

As best illustrated in FIGS. 6 and 10, the FSRs 90,92 are offset from the centerline of the vehicle. In this manner a differential force, and hence FSR output, will be developed when the tether is pulled off-center. In other words, when the tether is pulled in one direction, the FSR on that side of center will experience less of a force decrease than the FSR on the other side of center. This difference is beneficially employed to develop steering input information for the vehicle controller.

Figure 11:
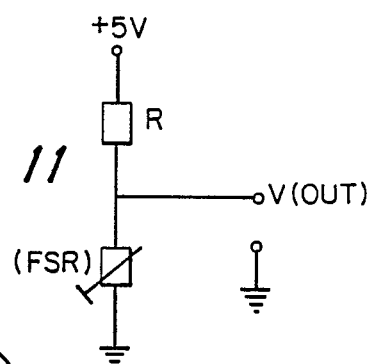
FIG. 11 is a schematic of a suitable sensor arrangement for a tether sensor for the vehicle of FIG. 1.

The electrical connection of each FSR is shown schematically in FIG. 11. As is known, such sensors vary their internal resistance approximately linearly with the force applied onto them. Their internal resistance is in the kilo-Ohm to Mego-Ohm range. The two sensors 90 and 92 apply to two degrees of freedom, such as vehicle steering and forward motion. The output signals from the FSRs 90, 92 are each in the form of a voltage, where:

$$V_{(out)} = \frac{V_{(in)} \times (FSR)}{R + (FSR)};$$

(FSR)=resistance of FSR.

Hence, the output from the FSRs the form of a voltage. The hose-pulling-to FSR force relationship, for another set of FSRs indicating tether tension, as discussed herein with respect to FIG. 9, would be inverted. Hence, the greater the force applied, the higher the voltage output (e.g., 0–5 Volt) and corresponding digital (e.g., 0–255) value.

The system controller (element 32 in FIG. 3) processes the incoming data in the following sequence:
  a. Make analog to digital conversions of the incoming FSR voltages.
  b. Shift the digital values so that zero force hose pulling corresponds to zero value.
  c. Check that any negative results from step b above also gives a zero output.
  d. Scale the current parameter values in such a way that maximum pulling force corresponds to maximum wheel velocity.
  e. Calculate the respective wheel speed.
  f. Check that the resulting wheel velocities are within the allowed regions.
  g. Perform smoothing, which is a kind of software low-pass filtering. In this way, any sudden changes will be damped.

The present invention has been implemented on an autonomous, domestic robot vacuum cleaner, powered from normal 110 V household current. Such a robot vacuum cleaner is described in detail in copending, commonly-owned U.S. patent application No. 307,765, filed Feb. 7, 1989, entitled "Autonomous Vehicle for Working on a Surface and Method of Controlling Same".

The aforementioned U.S. patent application No. 307,765 describes a canister vacuum cleaner, weighing approximately 14 kg (31 lbs.) and having the physical dimensions of length=61 cm, width=35 cm and height=21 cm. The unit keeps track of its power (mains-connected) cord by traveling in radial motion patterns, starting at the electrical wall outlet.

In the aforementioned U.S. patent application No. 307,765, the robot starts by traveling forward in a straight line for a certain predetermined distance. If it succeeds in going the whole distance uninterrupted, this sector is regarded as open. If not, a bumper in the front will register a possible collision. The vehicle will quickly stop and then start traveling backward the same distance it did travel forward, i.e., return to the point of origin.

In the aforementioned U.S. patent application No. 307,765, the infrastructure in the form of servo-motors, CPU, bumper sensor, etc. is already present. Hence, the additional cost for also adding the tether-guided features of this invention would be minute.

FIG. 9 shows a steering (tether) sensor for the vehicle. A mechanical linkage conveys the tether (14) tension vector into a force and position on the sensor surface. Pressure (tension) on the sensor results in forward motion. Increased pressure results in faster motion. Movement of the tether to the left of center will steer the vehicle left. Movement of the tether to the right of center will steer the vehicle right.

The hose force sensors are incorporated in the T-shaped plastic tubing. The two FSRs are squeezed underneath the plastic platform/base of the T-tube.

When sensing the hose pull force, the torque exerted onto the T-tube must be distinguished from the torque coming from the hose leaning forward onto the floor (by its own weight) when not in use.

The FSRs are located behind the rear two corners of the platform. Two large clips exert a pre-strained force onto the FSRs. By doing so, pulling the hose forward relieves forces at the FSRs. The pre-strained forces of the clips will neutralize the forward-leaning force of the hose resting on the floor.

The hose pulling forces can also be sensed by using the same kind of conductive foam material as described in the bumper above. As the foam design can also handle (relative) force measurements, a slice of foam stuck underneath the T-shaped tube (described above), will indicate pressure forces. Two electrodes will have to be connected to the foam (one on each side) and then hooked up to two CPU A/D inputs.

Suitable FSRs are made by the following company: Interlink Electronics, 535 E. Montecito Santa Barbara, Calif. 93103.

Each FSR is suitably connected to a pull-up resistor of 56 kilo-Ohm. The resistor-divided voltage is then suitably fed to an A/D input of a CPU (such as a Motorola MC68HC-11A8) functioning as the controller of FIG. 3.

The CPU controls the two (left and right wheel) servo-motors via two HP HCTL-1000 servo motor controller ICs. The CPU orders individual speeds to each motor. The vehicle is steered by differential drive.

It is evident from the above description, that the present invention differs significantly from the prior art. For instance, the aforementioned U.S. Pat. No. 3,896,892 discloses a "tiller" which provides for two forward and a reverse speed control. In contrast thereto, the present invention provides servo pull, a continuous range of forward speeds in response to tether tension. Furthermore, the present invention provides for automatic detouring around an obstacle, wherein the vehicle reverses and reroutes itself in response to contact with an obstacle.

What is claimed is:

1. A method of controlling the movement of a semi-autonomous vehicle about a surface comprising the steps of:
  providing a tether attached to the vehicle;
  sensing tension, T, on the tether;
  providing the vehicle with a contact sensitive bumper about at least a front peripheral portion of the vehicle;
  causing the vehicle to move forward at a velocity, v, in response to the second tension on the tether;
  in response to the bumper contacting an obstacle, causing the vehicle to stop and back up a distance, d;
  after the vehicle has backed up the distance, d, causing the vehicle to turn through an angle, $\alpha$,; and
  after the vehicle has turned through the angle, $\alpha$, resuming a forward motion in response to continued tension, T, on the tether.

2. A method according to claim 1, wherein:
  the forward velocity, v, of the vehicle is proportional to the tension on the tether.

3. A method according to claim 1, wherein:

the bumper senses a position, P, of contact with an obstacle relative to the vehicle; and in response to contact with an obstacle, the vehicle backs up away from the obstacle.

4. A method according to claim 1, wherein:

the bumper senses a position, P, of contact with an obstacle relative to the vehicle; and after backing up, the vehicle turns away from the obstacle.

5. A method according to claim 1, wherein;

the vehicle pauses after contacting an obstacle and before backing up.

6. A method according to claim 1, wherein:

after backing up, the vehicle turns through an angle, $\alpha$, proportion to a position, P, of contact with the obstacle.

7. A method according to claim 1, further comprising:

repeating the steps of backing up, turning and resuming forward motion of the vehicle until a detour around the obstacle can be made.

8. A method according to claim 1, further comprising:

sensing a directional angle $\theta$ the tether makes with the vehicle; and causing the vehicle to move forward in response to the sensed directional angle of the tether.

9. A method according to claim 1, further comprising:

providing the tether with a sensor indicative of a user holding the tether; and prohibiting any motion of the vehicle if the tether is not being held by a user.

10. A method according to claim 1, further comprising:

incorporating a soft start feature, f, in the step of causing the vehicle to move forward in response to the sensed tension on the tether.

11. A method according to claim 1, further comprising:

incorporating a damping factor, h, in the step of resuming vehicle forward motion after the vehicle has backed up and turned in response to contacting an obstacle.

12. A semiautonomous vehicle for moving about a surface, comprising:

a body member, means for moving and turning the body member, a tether attached to the vehicle;

tether sensor means, to which the tether is attached, for sensing tension, T, on the tether;

bumper means disposed about at least a front peripheral portion of the vehicle for sensing contact of the vehicle with an obstacle;

means for exercising control over motion and turning of the vehicle in response to the tether sensor means and the bumper means;

said tether sensing means including:

a flange to which the tether is attached;

a platform which is relatively fixed with respect to the vehicle;

means resiliently holding the flange against the platform; and at least one force sensitive device disposed between the flange and the platform indicating a torque resulting from tension on the tether.

13. Apparatus according to claim 12, wherein:

the means resiliently holding the flange against the platform includes foam sandwiched between the flange and the platform and clips exerting a bias to hold the flange against the platform.

14. Apparatus according to claim 13, wherein:

the bias is established to preload the at least one force sensitive device to a midpoint of an operating range when there is no tension on the tether.

15. Apparatus according to claim 12, wherein the at least one force sensitive device is disposed rearward of the tether.

16. Apparatus according to claim 12, wherein:

two force sensitive devices are disposed between the flange and the platform.

17. Apparatus according to claim 16, wherein:

the two force sensitive devices are disposed on either side of a longitudinal centerline of the vehicle so as to provide a differential output in response to a tension off-set from the longitudinal center line on the tether indicative of a steering input.

* * * * *